Aug. 21, 1945. E. D. GARRETT 2,383,248
COMBINATION TUBING HEAD AND TUBING SUPPORT
Filed Oct. 25, 1941 2 Sheets-Sheet 1

INVENTOR.
Ernest D. Garrett
ATTORNEYS.

Aug. 21, 1945. E. D. GARRETT 2,383,248
COMBINATION TUBING HEAD AND TUBING SUPPORT
Filed Oct. 25, 1941 2 Sheets-Sheet 2

INVENTOR.
Ernest D. Garrett
BY Lancaster, Allwine & Rommel
ATTORNEYS.

Patented Aug. 21, 1945

2,383,248

UNITED STATES PATENT OFFICE 2,383,248

COMBINATION TUBING HEAD AND TUBING SUPPORT

Ernest Dean Garrett, Shreveport, La., assignor to The Brewster Company, Inc., Shreveport, La., a corporation Application October 25, 1941, Serial No. 416,567

5 Claims. (Cl. 166—14)

The present invention relates to well head equipment for use on high pressure oil and gas or gas distillate wells and more particularly to an improved tubing head assembly providing a safe, convenient and economical means for sealing the space about the well tubing, together with means for suspending the tubing.

A primary object of the invention is to provide a combined tubing support and sealing head assembly which will be strong and compact, and of such construction as to provide for adequate sealing, allow for the renewal or repair of the sealing means, and which will permit the raising, lowering and rotating of the tubing without disturbing the effectiveness of the sealing means.

A further object of the invention is to provide a combination tubing support and double seal head assembly in which the outer sealing means is easily and readily accessible so as to make it possible to renew the seal about the tubing of a producing oil or gas well in a simple, safe and convenient manner without the necessity of equipment for lifting the tubing in the well, and without the necessity of disturbing the tubing supporting means.

There are now in use some types of double sealed tubing head assemblies and in such assemblies most generally used an exposed threaded connection is employed to hold such assemblies together. This type of connection causes difficulty in making pressure tight connections and is easily damaged in operation. The main connection nut must be hammered to tighten, and this may cause injury to gauges and other vital fittings on the assembly. Also the tubing support means are placed entirely above both the primary and secondary sealing means. With the support means located above both the primary and secondary sealing means, access to the sealing means is difficult, and various other disadvantages and hazards are present in such head assemblies. This entails excessive and inconvenient height which adds unnecessary strain to the head assembly thru vibration and wind pressure and causes general inconvenience in removing drilling machinery and in other operations around the well. In addition, the tubing support means are exposed causing more rapid deterioration thereof as well as of tubing roughened by such support means.

It is therefore a further object of the invention to provide a compact combination tubing head and tubing support which will eliminate unnecessary height and consequent strain on the head assembly; a stronger assembly because of the use of flanged connections instead of threaded connections and the hazards inherent in the tightening of threaded connections are avoided; and wherein the renewal of the upper sealing element is rendered less hazardous and made more convenient.

A still further object resides in the arrangement wherein the tubing suspension means are enclosed in the assembly and are placed between the primary and secondary sealing means, which affords protection from exposure to both the suspension means and the tubing, renders the top sealing means readily accessible for renewal or repair, and which may be more easily installed than other apparatus now in general use.

A still further object resides in the provision of means for detecting leakage past the inner or primary sealing means of the assembly.

Other objects and advantages of the invention will be apparent from the following detailed description taken in connection with the accompanying drawings forming a part of this specification and in which drawings—

Figure 1:
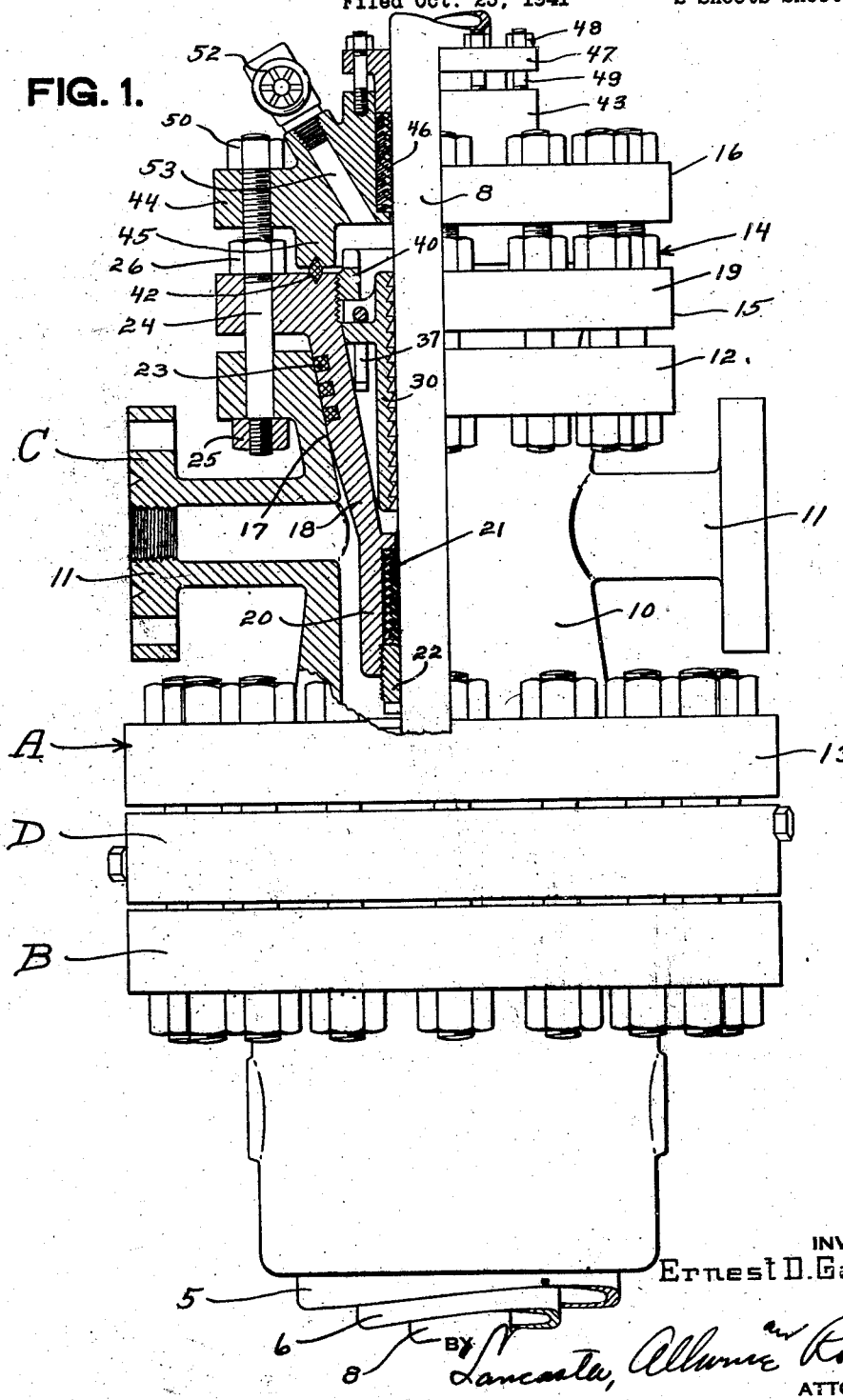
Figure 1 is a view part in vertical section and part in elevation, showing the head assembly of this invention incorporated in a well control hook-up.
Figure 2:
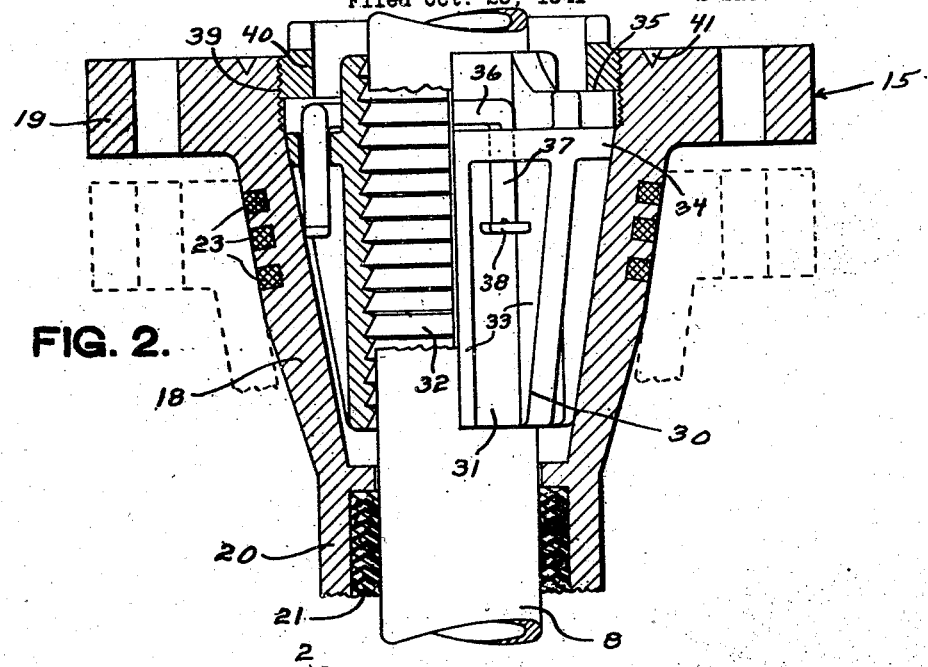
Figure 2 is a sectional view substantially on line 2—2 of Figure 3.
Figure 3:
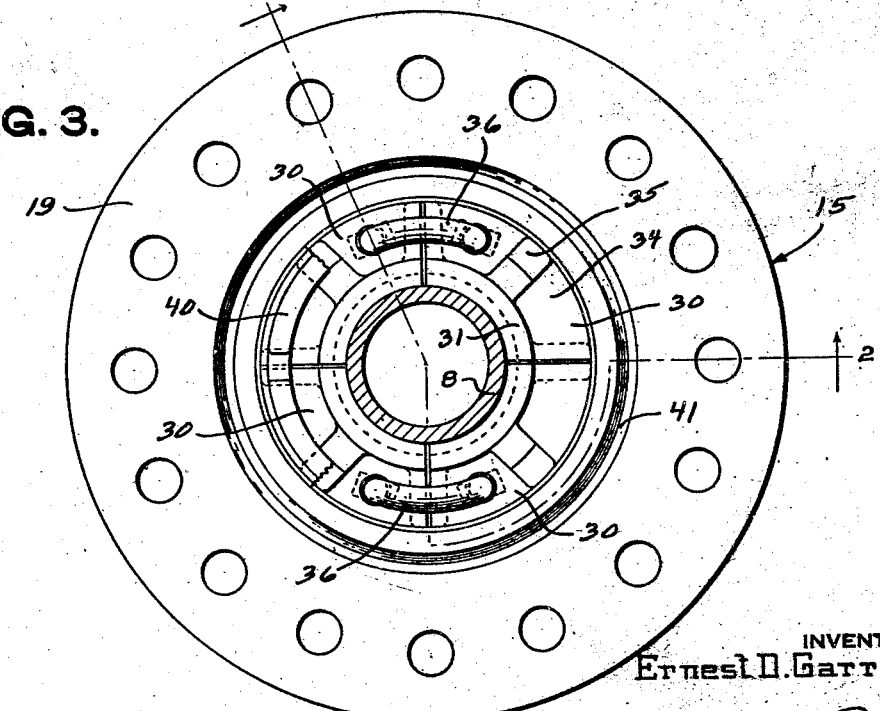
Figure 3 is a top plan view of the combined slip bowl and stuffing box body shown in Figure 2, with a portion of the slip hold-down nut broken away.

Referring to the drawings in detail and wherein like reference characters designate corresponding parts thruout the several views, the letter A may generally designate a high pressure well control hook-up embodying a flanged casing head B with which is associated the improved tubing head C of this invention. The letter D may designate a casing pack-off flange such as disclosed in my co-pending application Serial Number 416,568, filed October 25, 1941.

The flanged casing head B is sealed in the customary manner to the outer casing 5 and suspends an inner or intermediate string of well casing 6 which is sealed to the outer casing 5 by the pack-off flange D as disclosed in my co-pending application referred to. A tubing 8 extends axially thru the inner casing 6 and is suspended therein by the tubing head C. The pack-off flange D may be omitted if desired, and the tubing head C may be sealed to the upper end of the well casing by means of the flanged casing head B or by any other means.

The tubing head C embodies a tubing head body 10 having lateral outlets 11 and upper and lower flanges 12 and 13 respectively, the body 10 being sealed to the well casing by the lower flange 13. Associated with the body 10 is a combined tubing support and double seal head assembly 14 including a combination tubing hanger and primary sealing means 15 and an outer or secondary sealing means 16.

The upper portion of the body 10 is provided with a tapered or conical seat 17 adapted to receive the conical slip bowl portion 18 of the hanger means 15. The bowl portion 18 is provided at its upper end with a flange 19 and at its lower end with a tubular sleeve portion 20 which is counterbored from its lower end for receiving a lower or primary packing 21 adapted to effect a seal between the tubing 8 and hanger means 15. This packing 21 is made up of rings having a V-shaped cross section and arranged with the open face of the rings downward toward the pressure so that pressure from within the casing will tend to expand the packing, causing it to press against the tubing and form a seal thereabout. A gland nut 22 threaded into the lower end of sleeve 20 serves to retain the packing 21 in place. The externally tapered surface of the conical slip bowl portion 18 is annularly grooved to receive sealing rings 23 which seat against the tapered seat 17 and form a seal between the body 10 and bowl 18.

Flange bolts 24 are passed thru the flanges 12 and 19, and nuts 25 and 26 are threaded on these bolts 24 and serve to force the bowl 18 into the body 10 to effect a seal at the rings 23.

The tubing head is of the slip suspension type, and the bowl portion 18 provides an enclosure for the tubing supporting means. This tubing supporting means embodies four tubing support slips 30 each having a segmental ring portion 31 provided on its inner side with grooves or teeth 32 which engage the tubing 8 for supporting the tubing. Extending longitudinally along the outside of the ring portions 31 are ribs 33 which are tapered toward the lower end of the slips and form tapered surfaces for seating on the tapered slip seat formed by the tapering inner surface of the slip bowl portion 18. Extending externally adjacent the upper end of each slip is a flange 34, and the central rib of each slip extends above this flange to form a shoulder 35. The adjacent pairs of slips are coupled together by means of a U-shaped handle 36 having its arms 37 extending downwardly thru openings in the flanges 34 and headed as at 38 to prevent withdrawal of the arms. Thus there are two handles for the four slips, and these handles provide an easy means for handling and installing the slips. By having the ribs 33 along the edges of the slips terminate at the flange 34, the arcuate hand gripping portions of the handles 36 will be below the shoulders 35 at the upper ends of the central ribs 33. The upper end of the slip bowl portion 18 is internally screw threaded as at 39 to receive a slip hold down nut 30 which engages the shoulders 35 and prevents the slips from rising once they have been set.

Provided in the upper face of the flange 19 is an annular groove 41 for receiving a sealing ring 42.

Referring now to the secondary or outer sealing means 16, this means consists of a flanged stuffing box and provides an outside accessible repackable sealing means to trap any leakage past the lower inside packing 21. This stuffing box or outer sealing means 16 includes a body portion 43 having a flange 44 below which extends a spacing ring flange 45 which spaces the flange 44 from the flange 19 and provides space for the nuts 26. This spacing flange 45 has an annular groove in its lower side to receive the sealing ring 42. The body portion 43 is counterbored from its upper end to receive a packing 46 which effects a seal between the body portion and the tubing 8. This packing 46 is made up of V-shaped rings of packing material of such nature and so arranged that pressure from within will tend to expand the packing and cause it to effect a seal about the tubing 8. The packing 46 is held in place by a flanged packing gland 47 forced down by nuts 48 threaded on stud bolts 49 which are screwed into the body portion 43. Thus the packing 46 is easily accessible and replaceable from the outside without having to disturb the tubing in any manner, by merely removing the nuts 48 and gland 47, and without danger of opening up the well and losing control of the same.

The flanged stuffing box or outer sealing means 16 is adapted to be sealed to the tubing hanger 15 by means of nuts 50 threaded on the upper ends of the flange bolts 24. As will be seen, the flange bolts 24 having threaded upper portions which extend thru the flange 44 so that the nuts 26 may be turned into engagement with the flange 19 of the tubing hanger.

A test valve 52 is associated with the outer sealing means 16 in order that any leakage past the inner packing 21 may be easily detected. The body portion 43 is provided with a test bore or passageway 53 into the outer end of which the test valve 52 is threaded. The inner end of this test bore 53 opens to the sealed area formed between the inner and outer packings 21 and 46 respectively, and upon opening of the valve 52, the accumulation of any pressure in this sealed area may be easily detected.

In the installation and use of the combination tubing head and tubing support, upon completing a well the tubing is generally lowered into the cased well bore after the tubing head body 10 has been installed on the casing head. The tubing hanger 15 carrying the packing 21, the hold-down nut 40, and the flanged stuffing box 16 are assembled in proper order on the last joint of tubing to be run but not connected by the bolts 24. When the last joint of tubing has been lowered into the well, the assembly 15 (less the slips 30) is fitted into the tapered seat 17 of the tubing head body 10 and the flange bolts 24 and nuts 25 and 26 are installed and tightened which forms a seal between the body 10 and assembly 15 by means of the sealing rings 23. The tubing 8 is also effectively sealed off from the outside or exterior by means of the inner packing 21.

The tubing can now be rotated, raised or lowered, as it can be moved thru the packing 21 without danger of damaging the packing, and thus such operations as setting packers, etc., can now be performed. Any pressure that may develop before or after the drilling fluid is displaced will be safely confined to the casing by the sealing elements 21 and 23.

After the tubing is located at the desired position, the slips 30 are installed in place and the hold-down nut 40 tightened for holding the slips in place. The assembly 16 is then lowered into place on the sealing ring 42 and the nuts 40 installed and tightened forming a sealed area about the tubing between sealing elements 21 and 46.

Any leakage past the inner or primary sealing element 21 may now be detected by merely opening the test valve 52. In the event both packing elements 21 and 46 become damaged to the extent that excessive leakage occurs past 46, the packing element 46 may be successfully renewed by first removing the gland 47 and any remnants of the old packing 46, and then loosening the nuts 50 sufficiently to allow escape of gas or other fluid between ring 42 and flange 44, while installing new packing element 46. The nuts 50 are then tightened to form the seal at the ring 42, and the nuts 48 tightened on the gland 47 until all leakage is stopped.

Changes in detail may be made to the form of invention herein shown and described without departing from the spirit of the invention or the scope of the following claims.

I claim:

1. A combination tubing support and double seal head, comprising a tubing head body having an upper flange, a tubing supporting means carrier seated in said body having a flange at its upper end and primary tubing sealing means at its lower end, a secondary tubing sealing member having a flange, and flange bolts and nuts connecting said body, carrier and sealing member in assembled relation and permitting removal of the secondary sealing member independent of the connection between the tubing head body and tubing supporting means carrier.

2. A combination tubing support and double seal head comprising a tubing head body having an upper flange, a tubing support means carrier seated in said body having a flange at its upper end and tubing packing means at its lower end, a secondary sealing member above said carrier having a flange and tubing packing means, flange bolts extending thru all of said flanges, a nut on the lower end of each bolt engaging the under side of the flange on the tubing head body, a nut on each bolt engaging the upper side of the flange on the support means carrier for securing the carrier in said body, and a nut on the upper end of each bolt engaging the upper side of the flange on said sealing member for securing said member to the tubing support means carrier.

3. A combination tubing support and double seal head, comprising a flanged tubing head body, a flanged tubing hanger seated in said body and having tubing packing rings at its lower end, tube engaging slips enclosed in said hanger above the packing rings, a flanged stuffing box above the hanger having accessible tubing packing rings, means sealing the hanger to the tubing head body, means sealing the stuffing box directly to the hanger, bolts extending thru all of said flanges, and nuts on each bolt permitting removal of the stuffing box without disturbing the connection between said body and hanger.

4. In a tubing head assemblage the combination of a tubing head body having a passageway therethru, a hanger having a tubing passageway therethru, said body providing seating means for sealed seating of the hanger in said body, a stuffing box casing having a tubing passageway therethru, flanged upon the stuffing box casing, hanger and body, adjustable bolt and nut means securing said flanges together for independent adjustment relative to each other, packing means between said stuffing box casing and the hanger for effecting a seal, means in the hanger for supporting a string of tubing, tubing packing means carried by the hanger below said tubing supporting means thereof, and externally accessible, and adjustable packing means carried by the stuffing box casing for effecting a seal with said tubing.

5. A well casing and tubing head assembly comprising a casing head assemblage having a tubing head body provided with a passageway therethru having a downwardly convergent tapered seat, a tubing hanger having a tapered outer surface seated upon the tapered seat of the body, sealing means directly between the tapered surfaces of the hanger and the tubing head body, the tubing hanger having a downwardly convergent tapered seat, slip means upon said last mentioned tapered seat of the tubing hanger for supporting tubing, sealing means carried by the tubing hanger for sealing against the tubing at a location below said tubing supporting slip means, slip tightening nut means carried by the tubing hanger at the upper end thereof for releasably tightening the slips in tubing supporting position, a stuffing box casing having a tubing receiving passageway therethrough, packing means in said stuffing box casing for sealing off the tubing in respect thereto at a location above the tubing hanger, sealing means directly between said stuffing box casing and tubing hanger, annular outwardly extending relatively spaced complementary flanges upon said tubing head body, tubing hanger and stuffing box casing having aligned bolt receiving openings therein, bolts through said openings having screw threaded portions above the flange of the stuffing box casing and also between the flange of the stuffing box casing and the flange of the tubing hanger, and independently adjustable nuts upon said threaded portion for tightening upon their respective bolts for effectively positioning the sealing means between the tubing head body and tubing hanger and between the tubing hanger and stuffing box casing.

ERNEST DEAN GARRETT.